Feb. 7, 1939.　　　　L. SALZMAN　　　　2,146,095
TRACTOR GUIDE
Filed May 28, 1937　　　　3 Sheets-Sheet 1
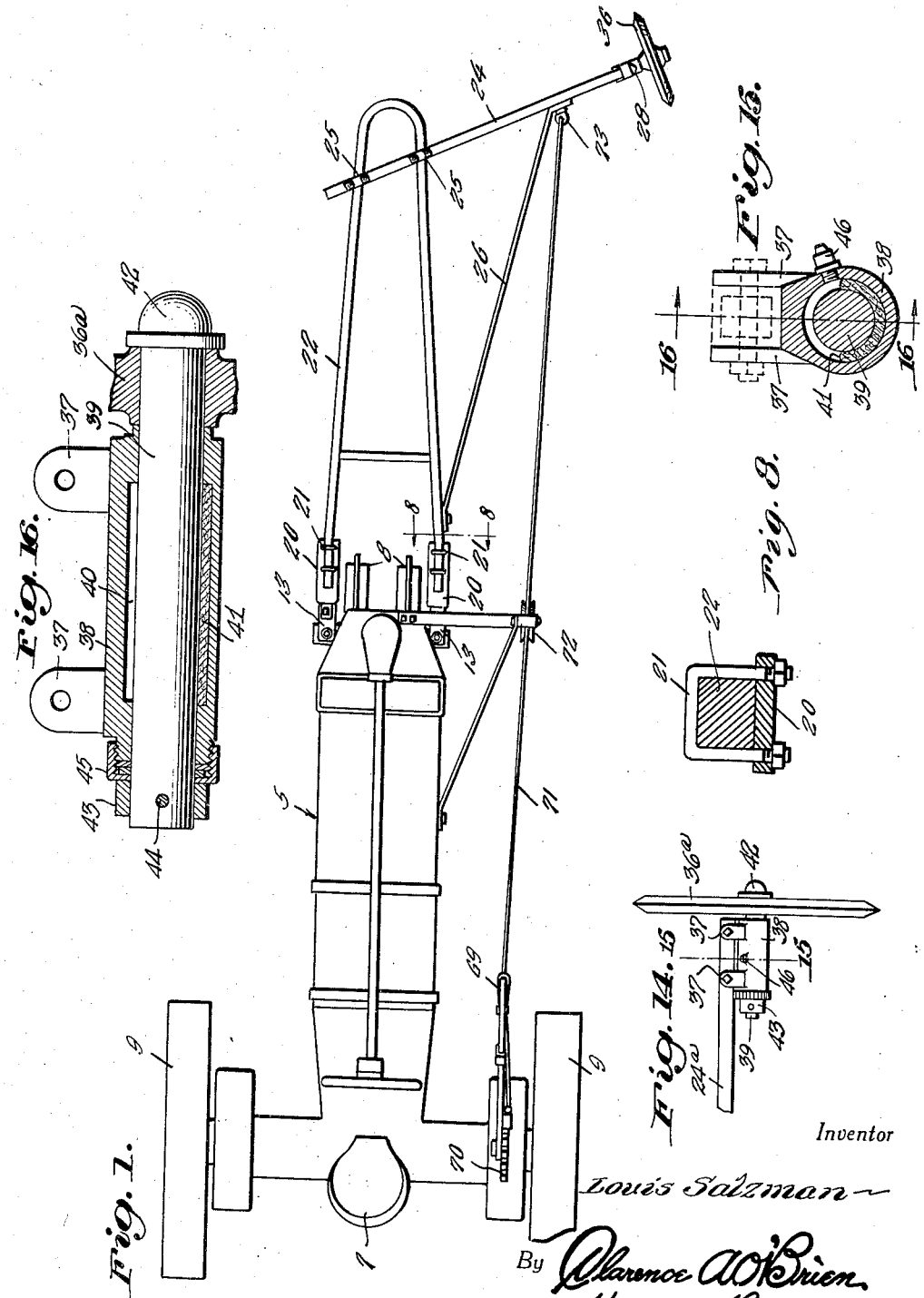
Inventor
Louis Salzman
By Clarence A. O'Brien
Hyman Berman
Attorneys Feb. 7, 1939.  L. SALZMAN  2,146,095
TRACTOR GUIDE
Filed May 28, 1937  3 Sheets-Sheet 2
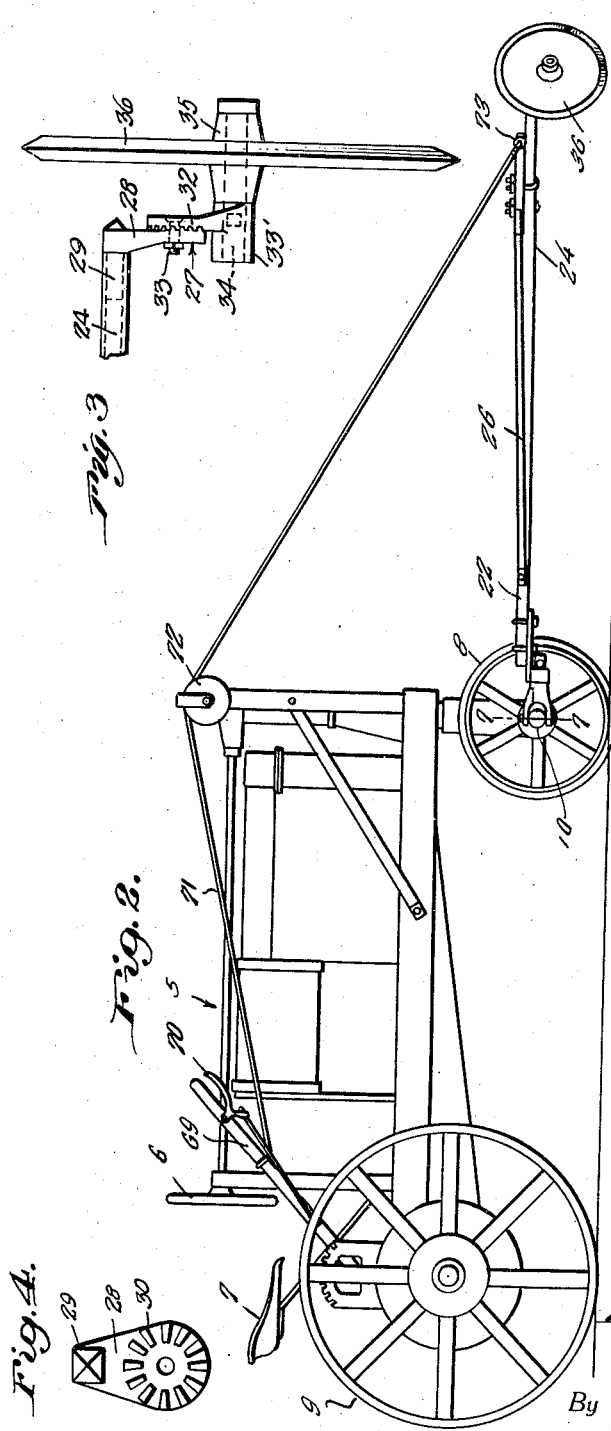
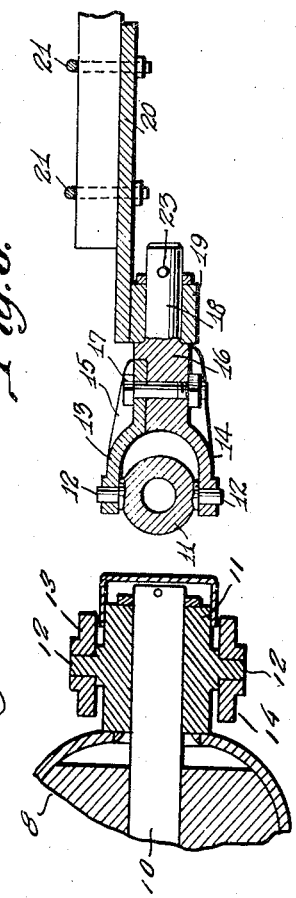
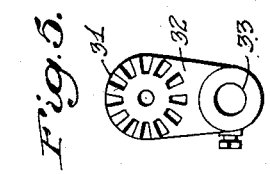
Inventor
Louis Salzman
By Clarence A. O'Brien
Hyman Berman
Attorneys

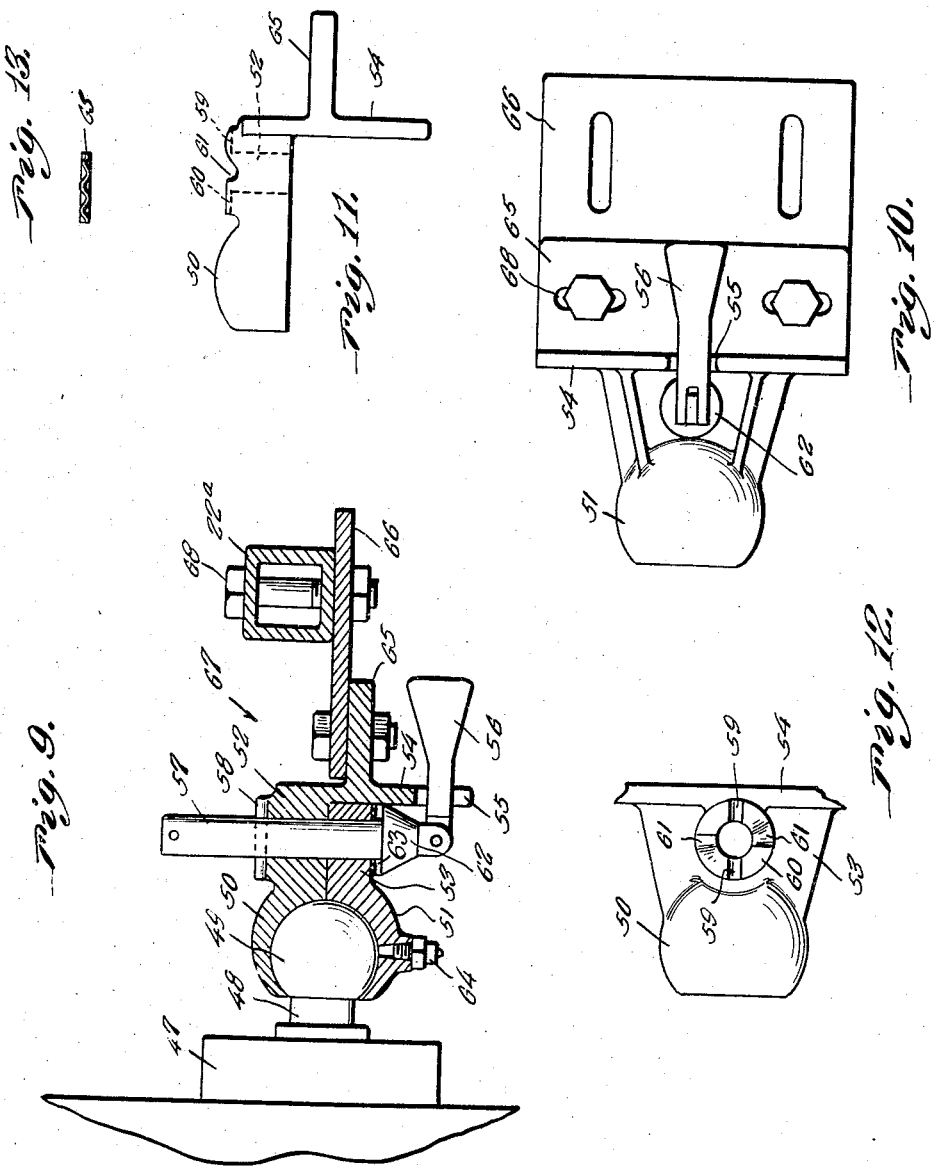

Patented Feb. 7, 1939

2,146,095

UNITED STATES PATENT OFFICE 2,146,095

TRACTOR GUIDE

Louis Salzman, Manteno, Ill., assignor to William Salzman, Kankakee, Ill.

Application May 28, 1937, Serial No. 145,329

3 Claims. (Cl. 97—49)

This invention appertains to new and useful improvements in tractor guides such as are employed in agricultural machinery.

The principal object of the present invention is to provide a machine guide of the character stated which can be easily adjusted and adapted to various types of tractors.

Another important object of the invention is to provide a guide which can be readily elevated or lowered as desired.

Another important object of the invention is to provide a tractor guide which can be mounted on conventional tractors without cost and modification of the tractor construction.

These and various other important objects and advantages of the invention will become apparent to the reader of the following specification.

In the drawings:

Figure 1 represents a top plan view of the apparatus.

Figure 2 represents a side elevational view of the apparatus.

Figure 3 is a fragmentary elevational view showing the guide wheel and mounting therefor.

Figure 4 is a side elevational view of one of the sections of the guide wheel mounting.

Figure 5 represents a side elevational view of the other section of the guide wheel mounting.

Figure 6 is a fragmentary detailed sectional view through one of the axle clamps.

Fig. 7 is a fragmentary sectional view on the line 7—7 of Figure 2.

Figure 8 is a sectional view on line 8—8 of Figure 1.

Figure 9 is a fragmentary detailed sectional view through a modified form of frame supporting clamp.

Figure 10 is a bottom plan view of the clamp structure shown in Figure 9.

Figure 11 is a side elevational view of the upper section of the clamp structure shown in Figure 9.

Figure 12 is a fragmentary top plan view of the clamp section shown in Figure 11.

Figure 13 is an edge elevational view of the washer employed in the clamp structure shown in Figure 9.

Figure 14 is a fragmentary side elevational view showing a modified form of guide wheel mounting.

Figure 15 is a section on the line 15—15 of Figure 14.

Figure 16 is a longitudinal sectional view on the line 16—16 of Figure 15.

Referring to the drawings, wherein like numerals designate like parts, it can be seen that numeral 5 generally refers to a tractor of conventional design, which includes the usual steering wheel 6, driver's seat 7, steerable wheels 8 and drive wheels 9.

In carrying out the present invention, it can be seen in Figure 7 that the ends of the axle 10 of the steerable wheels 8 are extended laterally at its ends beyond the wheels 8 and over each end of the axle 10 is disposed a collar 11 having upwardly and downwardly disposed trunnions 12, which trunnions are disposed through the leg portions 13 and 14 of the clamp sections 15—16, respectively, these clamp sections being bolted together as at 17. The clamp section 16 is provided with the cylindrical extension 18 disposed through the apertured depending ear 19 on the adjacent end of the plate 20 through which U-bolts 21 are disposed for clamping the adjacent end of the elongated U-shaped frame 22 to the said plate 20. Thus, the ends of the elongated U-shaped frame 22 are swingably connected to the ends of the axle 10. A cross pin 23 is disposed through the cylindrical extension 18 to prevent displacement of the ear 19 from association with the clamp section 16.

A laterally disposed guide wheel supporting arm 24 is secured to the leg portions of the frame 22 by U-bolts 25, and a brace rod 26 extends from the outer portion of the arm 24 to the free end portion of one of the legs of the frame 22 so as to brace the said arm 24.

A mounting such as is generally referred to by numeral 27 is provided at the free end of the arm 24 and consists of the plate 28 having the plug portion 29 disposed into the adjacent end of the tubular arm 24.

This plate 28 is provided with the radial arrangement of teeth 30 with which the teeth 31 on the complemental plate 32 can mesh. A bolt and nut assembly 33 serves to connect these plates 28—32 together in teeth meshing relation.

The plate 32 projects upwardly from the collar 33' which receives one end of the shaft 34, which shaft also extends through the hub 35 of the guide wheel 36. With this mounting, the guide wheel can be adjusted as desired.

A modified form of mounting for the guide wheel is shown in Figures 14 to 16 inclusive, wherein it can be seen that the arm 24a is disposed between the upstanding pairs of ears 37 located on the barrel 38 through the shaft or axle of the guide wheel 36a is disposed. The axle 39 is journalled through the end portions of the barrel 38 while the intermediate portion of the barrel 38 is provided with an internal pocket 40 serving as a packing box in which packing material 41 and lubricant can be placed.

The wheel end of the axle 39 is provided with the head 42, while the opposite end of the axle 39 is provided with the collar 43 with a pin 44 disposed through the same and the axle 39 to prevent displacement of the axle. Furthermore, this end of the barrel 38 is provided with a threaded cap 45. Oil or other lubricant can be injected into the box 40 by way of the check valve 46.

A modified form of attaching means for the frame 22 is shown in Figure 9 wherein the hub caps 47 of the wheels are provided with shanks 48 extending outwardly therefrom and each having a ball-like head 49. Clamp structures are disposed around these ball heads 49 and each consist of the sections 50—51, which put together form a ball socket. The sections 50—51 are provided with the plate-like extensions 52—53 respectively, the plates 52 having the depending flanges 54 notched as at 55 for receiving the pivotal handle 56 at the lower end of the retaining pin 57. This retaining pin has a cross key 58 which is meshable with the grooves 59 in the boss formation 60 or with the depressions 61 when the cross key is to be removed. The lower portion of the pin 57 is provided with the head 62 between which and the plate 53 a compressible washer 63 is interposed. Obviously, by disconnecting the handle 56 from the notches 55 of the flange 54 and rotating the pin 57 so that the cross key 58 will ride into the notches 61, the cross key will be sufficiently free to permit easy displacement of the same so that the pin 57 can release the sections 50—51. The ball 49 can be lubricated by way of the valve fitting 64.

The flange 54 is provided with right angularly disposed flange 65 which has the plate 66 secured thereto by bolts 67 and slots 68.

To these plates 66 of the two assemblies generally referred to by numeral 67 are secured the leg portions of a U-shaped frame 22a by bolts or the like 68.

It can now be seen that with this form of connection, as well as with the form shown in Figure 7, the guide wheel 36 or 36a in following the furrow will move the frame 22 and consequently the steerable wheels of the tractor without steering effort on the part of the driver.

A hand bar 69 having a detent 70 has the rear end of the cable 71 attached thereto and this cable extends over the pulley 72 mounted on the forward portion of the tractor and downwardly to connect to the eye 73 on the arm 24. Thus the arm 24 can be lifted or lowered as desired.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

1. In combination, a tractor, a steerable wheel for the tractor, a mount for the steerable wheel, said mount being provided with a forwardly extending member, a laterally disposed arm on the member, a journal box on the outer end of the said arm, a guide wheel provided with a shaft, said shaft being disposed through the said journal box.

2. In combination, a tractor having a steerable wheel, a mount for the steerable wheel, a forwardly projecting frame extending from the said mount, a lateral arm mounted on the frame, a furrow following guide wheel on the arm and adjustable means between the said guide wheel and the arm, said frame being provided with sectional sockets at its rear end, said mount being provided with ball-like extensions protruding laterally thereof and over which the said sockets of the frame engage.

3. In combination, a tractor, a steerable wheel for the tractor, a mount for the steerable wheel, said mount being provided with a forwardly extending member, a laterally disposed arm on the member, a guide wheel, adjustable means between the guide wheel and the arm, said adjustable means consisting of a plate provided with teeth extending from the outer end of the arm, a collar provided with a laterally disposed plate, the last-mentioned plate being provided with teeth for meshed engagement with the teeth of the first-mentioned plate, securing means for holding the plates in meshing relation, a shaft for the wheel, said shaft being disposed into the collar.

LOUIS SALZMAN.